United States Patent [19]
Norman

[11] 4,379,752
[45] Apr. 12, 1983

[54] METHOD FOR DESTRUCTION OF POLYHALOGENATED BIPHENYLS

[75] Inventor: Oscar L. Norman, Wilmington, Del.

[73] Assignee: Sun-Ohio, Inc., Canton, Ohio

[21] Appl. No.: 284,047

[22] Filed: Jul. 17, 1981

Related U.S. Application Data

[63] Continuation-in-part of Ser. No. 180,752, Aug. 25, 1980, abandoned.

[51] Int. Cl.³ ............ B01D 21/00
[52] U.S. Cl. ............ 210/712; 210/719; 210/737; 210/757; 210/909
[58] Field of Search ............ 210/757, 766, 909, 765, 210/805, 712, 719, 737

[56] References Cited

U.S. PATENT DOCUMENTS

| | | | |
|---|---|---|---|
| 3,686,337 | 8/1972 | Chang | 260/650 R |
| 4,040,958 | 8/1977 | Rammler | 210/805 |
| 4,340,471 | 7/1982 | Jordan | 210/909 |

FOREIGN PATENT DOCUMENTS

| | | | |
|---|---|---|---|
| 1917357 | 5/1970 | Fed. Rep. of Germany . | |
| 49-82570 | 8/1974 | Japan | 210/909 |

OTHER PUBLICATIONS

*The Franklin Institute News*, vol. 44, No. 2, Jun.–Jul., 1980.
Oku et al., "A Complete Dechlorination of Polychlorinated Biphenyl by Sodium Naphthalene", Chemistry and Industry, Nov. 4, 1978, pp. 841–842.
"Sodium Dispersion", Brochure of U.S. Industrial Chemicals Co., pp. 38–39.
Berry, R., "Rerefining Waste Oil", Chemical Engineering, Apr. 23, 1979, pp. 104–106.
Chem. Abstr. 82 125822u, 1975.
*Science News*, vol. 116, p. 422.
"A Safe, Efficient Chemical Disposal Method for Polychlorinated Biphenyls-PCB's", Goodyear Tire and Rubber Company publication (1980).
Parker et al., *Plant Engineering*, p. 133, Aug. 21, 1980.

*Primary Examiner*—Ivars C. Cintins
*Attorney, Agent, or Firm*—J. Edward Hess; Donald R. Johnson; Paul Lipsitz

[57] ABSTRACT

A continuous method for destroying polyhalogenated biphenyls by reacting a solution of the biphenyls in an inert liquid at a concentration of from about 1% to about 5% by weight with a dispersion of sodium in a hydrocarbon oil.

3 Claims, 1 Drawing Figure

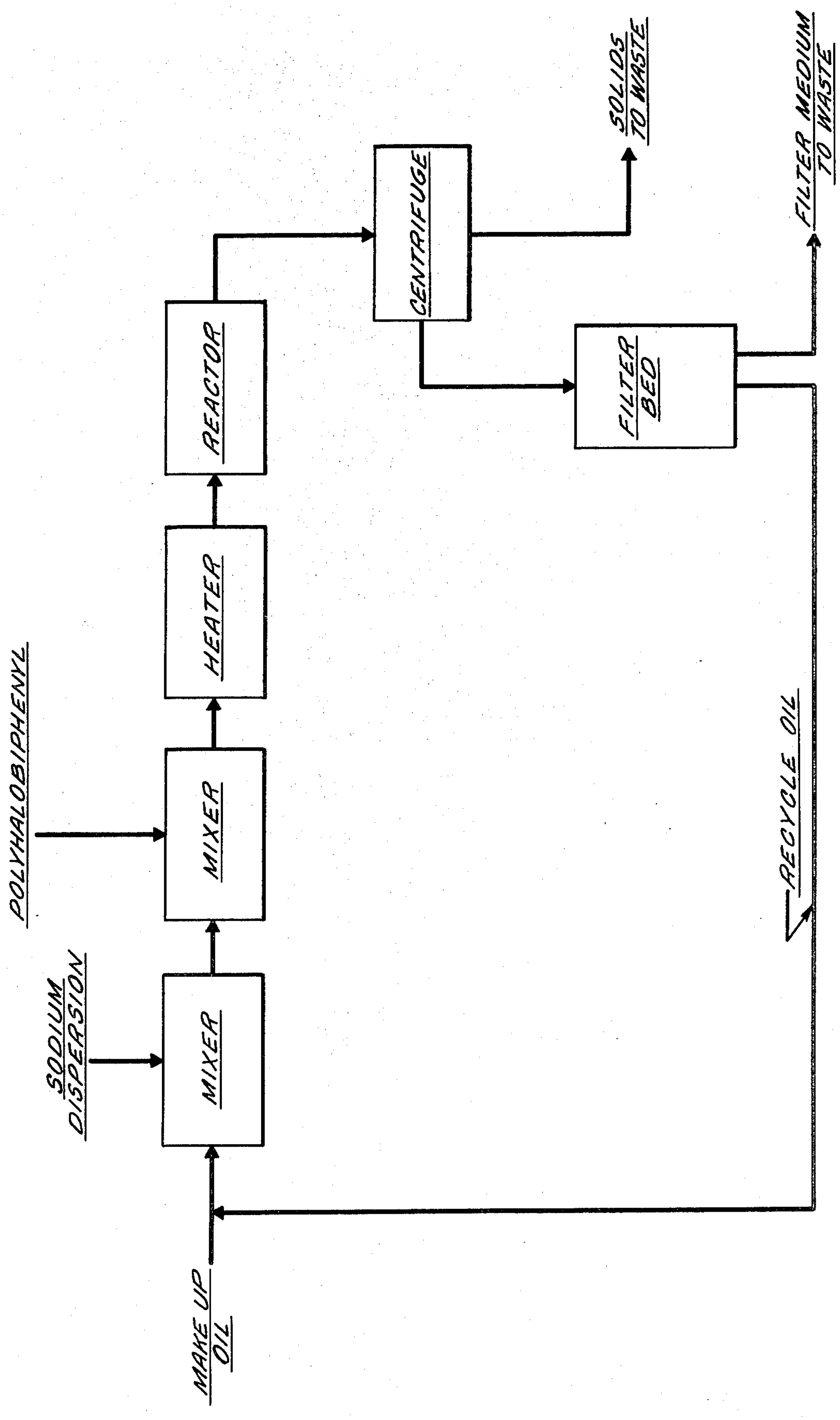
MAKE UP OIL
SODIUM DISPERSION
MIXER
POLYHALOBIPHENYL
MIXER
HEATER
REACTOR
CENTRIFUGE
SOLIDS TO WASTE
FILTER BED
FILTER MEDIUM TO WASTE
RECYCLE OIL

METHOD FOR DESTRUCTION OF POLYHALOGENATED BIPHENYLS

This application is a continuation in part of Ser. No. 180,752, filed Aug. 25, 1980 and is related to Ser. No. 99,341, filed Nov. 30, 1979 and its continuation in part application Ser. No. 179,345, filed Aug. 18, 1980, all now abandoned.

As is well known, polyhalogenated biphenyls such as polychlorobiphenyls (PCB's) and polybromobiphenyls (PBB's) are toxic materials whose use has been curtailed for environmental reasons. Because of their thermally stable and non-flammable properties PCB's have been used as dielectric materials for transformers and capacitors, and as heat transfer agents, and the like.

It is known that sodium dispersions and high-surface sodium are useful in eliminating impurities such as halides from petroleum fractions and other hydrocarbons (U.S.I. Industrial Chemicals Co. brochure "Sodium Dispersions"). Sodium naphthalene has also been used to dechlorinate polychlorinated biphenyl as disclosed by Akira Oku, et al. (Chemistry and Industry, 4, Nov. 1978). Generally the procedures employed are batch techniques at a fixed site and do not lend themselves to field processing.

The present invention is directed to a field method for destroying polyhalogenated aromatic compounds by a cyclic process which involves contacting the PCB's and PBB's in an inert fluid with sodium dispersed in a hydrocarbon oil. In the process of the invention the PCB's or PBB's are injected into a continuously recirculating inert liquid medium (preferably a hydrocarbon oil, or other inert liquid) held at a temperature above about 75° C., then injecting a sodium dispersion upstream or downstream from the PCB or PBB injection point, allowing reaction to occur in the circulating liquid stream and separating the particulate solids that are formed for disposal. In a preferred process the oil is passed through a conduit equipped with mixing means to ensure mixing of the halogenated biphenyls with the oil and with the added sodium dispersion. The treated liquid is passed through a heating zone to obtain a reaction temperature of above about 75° C. up to about 150° C. and then after reaction has occurred, passed through a filter medium or other separating means to remove particulate material and the liquid is then recycled.

The sodium dispersion used in the process of the invention will be one where the particle size of the sodium particles is preferably on the order of about one to about ten microns. Sodium dispersions where the sodium particle is about twenty microns are operable for the process, but are less time efficient. Suitable dispersions are commercially available and are exemplified by Matheson Light Oil Sodium Dispersion. Reference is also made to the text by Fatt and Tashima entitled "Alkali Metal Dispersions," D. Van Nostrand Company, Inc., New York, 1961, which describes the preparation of these dispersions in detail.

The amount of sodium dispersion used in the system will be at least stoichiometric or in significant excess to the amount of halogen being treated in the system. The halogenated biphenyl will be injected into the circulating liquid so as to be at an initial concentration of from about 1% to about 5%, preferably 1% to 2%, most preferably about 1.5% by weight in the circulating fluid before reaction. Above about 5% should be avoided since the high viscosity of the system due to the reaction products makes mixing inefficient. The flow rate of the oil through the system will be controlled to be from about 5 to about 25 gallons per minute. As indicated the method of the invention is continuous and, preferably, will employ a system similar to that shown in the drawing. The appropriate amount of sodium dispersion under slight nitrogen pressure or by other positive displacement is metered into the circulating fluid (shown as oil) from a dispersion storage tank. The oil and dispersion are mixed and the mixture proceeds through the system to a zone at which the halogenated biphenyl is added and the reactants mixed. The mixers used in the system may be a stirred agitator, or interfacial surface generator mixing devices may be used, such as those exemplified by the types disclosed in U.S. Pat. Nos. 2,747,844, 3,195,865, 3,394,924 and 3,632,090. These static mixers have no moving parts, require no maintenance or power, are compact and can form an integral part of the circulating system. The drawing shows the mixed fluid entering a heating zone where it is brought to a temperature of above about 75° C. up to about 150° C. in order to ensure essentially complete reaction of the halogen compound with the sodium metal in the dispersion. However, the heating zone may be positioned at other locations; e.g., in the mixing stage or even before the introduction of the sodium dispersion. All that is required is that the mixture of sodium dispersion and oil be heated to a temperature of above about 75° C. up to about 150° C. for reaction to occur and for completion of reaction. In general, the initial temperature of the reaction mixture will be between about 100° and about 125° C.; but the temperature of the system will increase due to reaction and usually will be controlled to a temperature between about 120° C. to about 150° C., and preferably between about 125° C. and about 130° C. The mixed reagents then pass to a reactor or reaction holding zone where reaction is completed, although, of course, if the conduit lines are sufficiently long, the reaction can be completed therein. The reacted mixture then flows to a separator such as a centrifuge system from which the solids are separated and sent to waste and oil recycled. Alternatively, or in conjunction with a centrifuge, a filter system may be used as the filter medium using any one of a number of filtering media including Fuller's earth, alumina, attapulgus clay, paper, and the like. The separated oil which is clear and water white or slightly colored is then recycled as shown. The entire system described above may be readily mounted on a pallet or flat bed truck and is easily transported to the site where the halogenated biphenyls are to be treated.

The polyhalogenated biphenyls are converted to inert, non-toxic substances, believed to be polyphenyls which are easily disposed without environmental problems.

The following examples simulates the continous method of the invention as shown in the drawing and illustrates its effectiveness.

EXAMPLE 1

A naphthenic oil (200 ml) was swept with nitrogen while stirring and heating to a temperature of 120° to 125° C. A 40% dispersion of sodium in a light hydrocarbon oil (9 ml) where the sodium had a particle size of from about one to about ten microns was added and then 1.04 g. of mixed polychlorinated biphenyl (2.5 ml of mixed Askarels in oil) was added and dissolved in the oil while the mixture was held on temperature at 120° to 130° C. as mixing continued for 15 minutes. Another 9 ml of the sodium dispersion and 1.04 g. of PCB's were added and stirred on temperature for 20 minutes after which another 9 ml of sodium dispersion and 1.04 g. of PCB's were again added. It was noted that with each PCB addition the temperature rose slightly to 130° to 132° C. After stirring for 30 minutes on temperature, the mass was allowed to cool to room temperature.

In order to work up the reaction mass for analysis, 30 ml of distilled water was carefully added with stirring over a 1.25 hour period, adding only a few drops initially and gradually increasing the amounts added. On standing overnight it was noted that some sludge had separated from the oil. The mass was diluted with 25 ml of water and neutralized with approximately 38 ml of HCl to take the pH to about 2.0. After 15 minutes of thorough mixing, a sample of the mass was filtered through Whatman No. 1 paper and the oil refiltered and dried by heating in a boiling water bath while sweeping with nitrogen. Total chlorine analysis of the dried sample showed a chlorine content of 20.8 ppm. The level of chlorine added to the oil as PCB's was 7670 ppm.

The insoluble sludge from the reaction product was separated from the remaining sample and worked up for analysis. The solids obtained showed no sign of melting, but "relaxed" at 300°-305° C. and decomposed above 360° C. Chlorine content was 0.72% which x-ray diffraction showed to be primarily sodium chloride.

Thus, the method of the invention destroys PCB's and similar polyhalogenated biphenyl compounds and a highly effective, efficient and cost effective means is provided for handling these toxic compounds.

EXAMPLE 2

Following the essential details of Example 1, approximately 50 gallons of an oil containing about 4500 ppm of PCB's was heated to 145° C. and pumped to a reaction vessel where about 12 pounds of a dispersion of sodium in a hydrocarbon was added at the rate of about 1,100 ml per minute over a five minute period. The treated oil pumped from the reaction vessel to a storage tank contained 7 ppm of PCB's.

The invention claimed is:

1. A continuous method for the destruction of polyhalogenated biphenyls which comprises injecting said biphenyls into a continuously circulating hydrocarbon oil to an initial concentration of from about 1% to about 3% by weight and effecting reaction in the oil circulating at about 5 to about 25 gallons per minute at a temperature above about 75° up to about 150° C. with a dispersion of sodium in a hydrocarbon oil wherein the particle size of the sodium particles is from about one to about ten microns, separating the particulate solids that are formed and recycling said hydrocarbon oil.

2. The method of claim 1 wherein the temperature is between about 125° C. and 130° C.

3. The method of claim 2 wherein the halogenated biphenyl is at a concentration of about 1.5%.

* * * * *